United States Patent

Cronin

[15] 3,703,664

[45] Nov. 21, 1972

[54] FAULT CURRENT LIMITER USING SUPERCONDUCTIVE ELEMENT

[72] Inventor: John C. Cronin, Greensburg, Pa.

[73] Assignee: I-T-E Imperial Corporation, Philadelphia, Pa.

[22] Filed: Oct. 5, 1970

[21] Appl. No.: 77,837

[52] U.S. Cl. ........................317/20, 317/50, 307/99, 307/131

[51] Int. Cl. ..............................................H02h 9/02

[58] Field of Search.......317/130, 20, 50, 11 C, 11 E, 317/40, 41; 307/245, 306, 93, 98, 99, 131, 136; 338/325; 336/DIG. 1; 323/50, 85, 86, 87, 44 F

[56] References Cited

UNITED STATES PATENTS

| | | | |
|---|---|---|---|
| 3,443,255 | 5/1969 | Massar | 336/DIG. 1 |
| 3,152,282 | 10/1964 | Baltensperger | 317/11 C |
| 1,104,733 | 7/1914 | Hunter | 317/20 |
| 3,454,831 | 7/1969 | Willard | 317/11 C |
| 2,946,030 | 7/1960 | Slade | 336/DIG. 1 |

*Primary Examiner*—J. D. Miller
*Assistant Examiner*—Harvey Fendelman
*Attorney*—Ostrolenk, Faber, Gerb & Soffen

[57] ABSTRACT

A superconductive impedance element is connected in parallel with a conventional impedance element and is switched from essentially zero impedance to a high impedance during switching operation, thereby to connect the conventional impedance in the circuit to limit the current in the circuit. The impedances switched into the circuit are inductively associated with the superconductive element. A pilot super-conductive element is disclosed for the high accuracy switching of a main superconductive element.

5 Claims, 5 Drawing Figures

PATENTED NOV 21 1972 3,703,664

INVENTOR.
JOHN C. CRONIN

BY

Ostrolenk, Faber, Gerb & Soffen

ATTORNEYS

FAULT CURRENT LIMITER USING SUPERCONDUCTIVE ELEMENT

RELATED APPLICATIONS

This application is related to copending application Ser. No. 88,327, filed Nov. 10, 1970, in the name of L. D. McConnell, which is assigned to the assignee of the present invention.

BACKGROUND OF THE INVENTION

This invention relates to fault current interrupters, and more particularly relates to the use of superconductive elements in a fault current limiting circuit which switch conventional impedances into the circuit responsive to their changing from a superconductive state to a normal conductive state.

Many materials become "superconductors," or have essentially zero resistance, when the temperature is reduced below a transition temperature which is characteristic of the material. These transition temperatures are usually close to absolute zero. For example, a commonly used alloy of niobium and tin, $Nb_3Sn$, will have a transition temperature of about 18.2°K. This material has an essentially zero resistivity below this temperature, and will have a substantial resistivity above the transition temperature, for example, $10 \times 10^{-6}$ ohm-cm. at about 23°K.

It is well known that superconductors will switch to a resistive state, even though held below their transition temperature if they are placed in a magnetic field having a given field strength.

Circuit interrupters have been proposed in which a superconductive device is switched into a resistive state by applying to the superconducting element a magnetic field greater than the critical field, or by heating the element to a temperature greater than the transition temperature. Such a device is shown in U.S. Pat. No. 3,384,762 to Mawardi. This patent also points out that the magnetic field produced by the current flow through the superconductive element can serve as the quenching field to cause the superconductor to switch to its normal state when the current reaches a given value.

When such a system is used in a power system, the almost instantaneous transition of the superconductive element to its normal resistive state induces very high voltage transients in the system.

SUMMARY OF THE INVENTION

In accordance with the present invention, a superconductor device is used to switch an impedance into a power system to limit fault current without imposing heavy transients on the system. The invention further provides a novel pilot superconductor and main superconductor element to improve the control of the conditions under which switching takes place, and to simplify the calibration of the pilot device.

In accordance with one aspect of the invention, two closely coupled coils are connected in parallel with one another and in series with the circuit being protected, and are wound to produce opposing fluxes. One of the coils is then formed of superconductive material while the other is of normal material. The two coils will then present an effective impedance to the circuit related only to the resistance of the winding of normal material. Once the superconducting coil is switched to a normal state, however, due to temperature increase above the transition temperature, or an increase in magnetic field above the critical value, the combination will have an impedance related to the inductive reactance of one of the coils. Thus, an inductance is switched into the circuit which will limit fault current. This switching action can be initiated responsive to an increase in current beyond a given value, thereby creating a magnetic field through the superconductor which is greater than a given value. Thus, current limiting action may be initiated directly in response to a fault current.

As an alternative, the current limiting impedance may consist of a transformer having its primary winding in series with the circuit being protected, and having a superconducting resistor connected across its secondary winding. The resistance of this superconducting element will be reflected into the primary circuit so that, when the superconductor is switched to a high resistance state, the impedance of the primary winding increases to limit short circuit current.

DETAILED DESCRIPTION OF THE PREFERRED EMBODIMENTS

Figure 1:
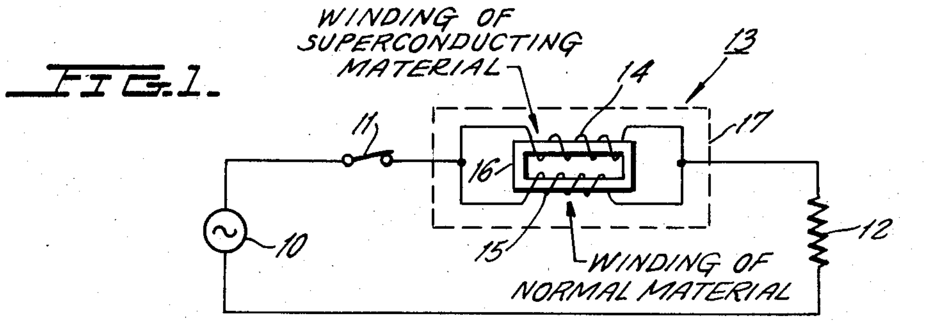
FIG. 1 is a circuit diagram of one embodiment of the present invention which includes a coil of superconducting material coupled with a coil of normal material.

Referring first to FIG. 1, there is shown in circuit which includes a power source 10, circuit breaker 11 (which could be a disconnect switch), load 12 and a current limiting device 13 constructed in accordance with the invention. While the source 10 is shown as a single phase a-c source, it will be apparent that the invention is not limited to this arrangement, and can be used in connection with d-c and multiphase a-c circuits of any desired voltage, current and frequency rating. Similarly, load 12, shown as a resistor load, could be of any other type.

The current limiting device consists of two windings 14 and 15 which are closely coupled, and are wound in directions to generate opposing magnetic fluxes. Thus, in FIG. 1, windings 14 and 15 are wound on an iron core 16 which closely couples the windings with the flux of the two winding circulating in opposite directions in the core 16. In accordance with the invention, the winding 14 is made of one of the superconducting materials, such as a niobium-tin alloy $Nb_3Sn$, while winding 15 is made of a conventional material such as copper or aluminum which does not exhibit superconductivity, or at least is not superconductive at temperatures at which the material of winding 14 is superconductive. The windings 14 and 15 are then immersed in a suitable cryogenic container, shown by dotted lines 17, filled, for example, with liquid helium which is held at a temperature below the transition temperature of winding 14.

Windings 14 and 15 are arranged to have substantially the same inductance and, accordingly, have about the same number of turns and same wound diameter. There is, however, an intentional mis-match of the two windings 14 and 15 to avoid a total cancellation of their net flux such that a given magnetic flux will flow, which is related to the current through the circuit.

Figure 2:
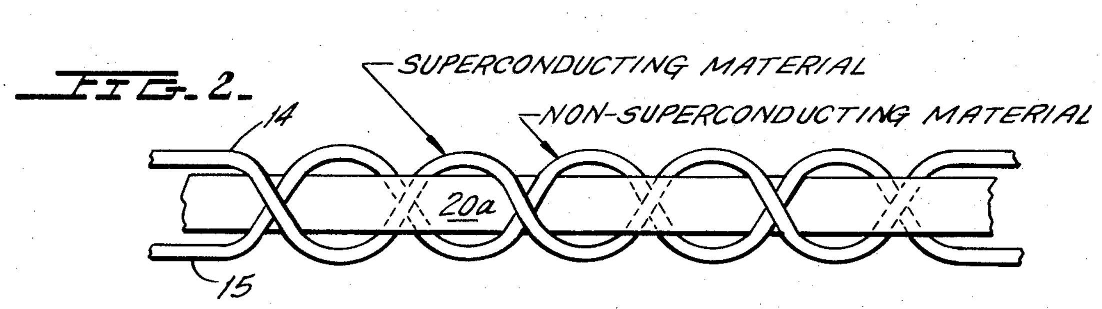
FIG. 2 illustrates the manner in which the coils of FIG. 1 can be wound.

FIG. 2 shows one manner in which windings 14 and 15 can be wound on a non-magnetic mandrel 20a (selected of a material which can easily withstand cryogenic temperatures) with the windings wound on one another and in opposite directions. The windings 14 and 15 will be insulated from one another, as by insulation spacers or layers, not shown in FIG. 2.

The operation of the circuit shown in FIG. 1 using the air coupling arrangement of FIG. 2 is as follows:

With switch 11 closed, and normal load current flowing in load 12, current divides between coils 14 and 15, with coil 14 being held at a temperature below its transition temperature. The net circulating flux between coils 14 and 15 which is created by the small, intentional mis-match between the coils creates a magnetic field which, so long as the circuit current is below a given or rated value, is below the critical field value required to switch coil 14 to a non!-superconducting condition. During this time, the resistance $R_1$ of the superconducting winding 14 is zero, and the normal winding 15 has a finite resistance $R_2$. For practical purposes, the mutual and self-inductance of windings 14 and 15 can be considered equal (the intentional mismatch needed for the creation of a triggering magnetic field is relatively small and can be ignored for the present purpose), and the steady state impedance Z of limiter 13 can be shown to be:

$$Z=R_2/[16+(R_2/\omega L)^2]^{1/2}$$

where $\omega$ is the angular frequency of source 10 and L is the inductance of winding 14 or winding 15.

Since, in the general situation, $R_2$ will be very small compared to $\omega L$, then it is seen that:

$$Z=R_2/4$$

Therefore, in normal operation, the inductance of windings 14 and 15 has almost no effect on the power flowing in the circuit and, by using conductors of adequate cross-section for coil 15, the normal impedance of limiter 13 will be very low.

In the event of a fault, for example, a short circuit on load 12, the circuit current will begin to rise toward the available short circuit current of the circuit. However, as this current rises, the net flux created by the disparity in design of windings 14 and 15 becomes greater than the critical magnetic field, and causes winding 14 to switch to its resistive, or non-superconductive, mode of operation. The resistance $R_1$ of the winding 14 in its resistive mode is made to be high compared to $\omega L$ so that current will no longer divide equally between windings 14 and 15 and more current will attempt to flow in the now lower resistance path of winding 15. Under this condition, with $R_2$ much less than $\omega L$ and with $R_1$ much greater than $R_2$, it can be shown that the impedance Z of the fault limiter 13 is now:

$$Z=R_2/[16+(R_1/\omega L)^2]^{1/2}$$

Since $R_1$ is much greater than $\omega L$:

$$Z=\omega L;$$

Accordingly, responsive to the generation of fault current, or that current through limiter 13 which causes switching of superconductor 13, the impedance of limiter 13 switches from the negligible $R_{2/4}$ to $\omega L$. Accordingly, the rise of the short circuit current will be limited by this inductance.

A particularly important advantage of the invention is that a relatively long superconductor element 14 can be used without making limiter 13 too large. Thus, in high voltage circuits, a high resistance, and, therefore, a long superconductor filament is necessary to limit the temperature rise. In order to decrease the space needed for such a long filament, it could be coiled, but this would introduce inductance into the circuit, even when the device is in its superconducting state. Thus, complicated non-inductive configurations would be necessary. With the present invention, the superconductor 14 may be simply wound in a coil since its inductance does not affect the circuit during normal operation.

The switching of superconductor 14 occurs when the magnetic field at the surface of the superconductor due to flow of current through the coil exceeds the critical value. The control of this switching point is difficult to calculate and control because of the geometry of the components, the effect of magnetic fields from other sources, and the like. In accordance with a further feature of the invention, a small and easily calibrated superconductor element is provided to carry the same current as the main superconductor (or a known proportion thereof), where the pilot superconductor has a simple configuration, such as a cylinder or wire, and is suitably shielded or is located sufficiently far from other current carrying elements to avoid the effect of stray magnetic fields. The pilot superconductor, when switched to a resistive state, may then generate heat or alter a magnetic field in a manner to switch the main superconductor.

Figure 3:
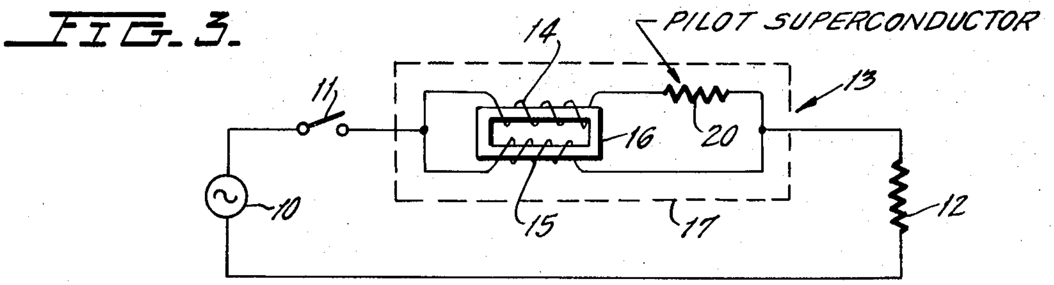
FIG. 3 illustrates the manner in which a pilot superconductor element can be used in the circuit of FIG. 1.

FIG. 3 shows the use of a pilot superconductor 20 made, for example, as a cylinder of superconducting material, used in the circuit of FIG. 1. Pilot superconductor 20 is in the same cryogenic atmosphere as superconductor 14, but is switched to a resistive state by an accurately known current. Moreover, pilot 20 may be located away from stray magnetic fields. If desired, a second pilot superconductor could be placed on the other side of winding 14.

In operation, when the current of the circuit of FIG. 3 exceeds a given value, the magnetic field at the surface of pilot superconductor 20 exceeds its critical value and superconductor 20 switches to a resistive state. The heat generated by resistance heating then propagates over the conductor connecting elements 14 and 20, which may be a conventional conductive material such as copper, and raises the end of superconductor 14 to above the transition temperature. This generates further heat such that a thermal front propagates along winding 14 until the entire winding is in a resistive state. This switching action is aided by the unbalance of current which begins as soon as element 14 becomes resistive, since the magnetic field then increases.

Figure 4:
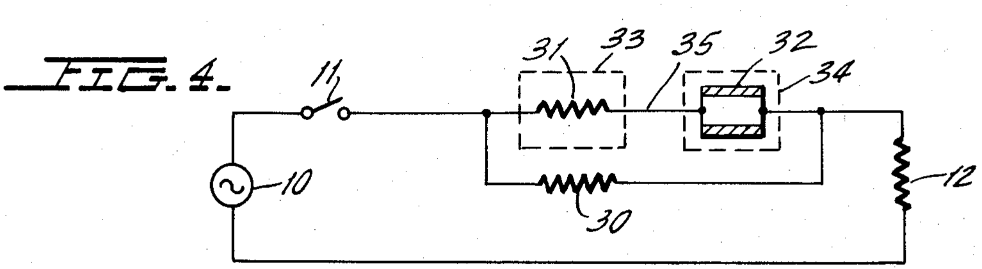
FIG. 4 illustrates a further embodiment of the invention showing the use of a pilot superconductor.

FIG. 4 shown a circuit using the pilot valve concept shown in FIG. 3 where source 10, switch 11 and load 12 are connected through a current limiter consisting of impedance 30, superconductor 31, which could be a non-inductive resistor when switched to a resistance state, and pilot superconductor device 32. Superconductor 31 may be housed in its own cryogenic housing 33 which is appropriately cooled without the need for high accuracy control. Pilot superconductor 32 may be a simple cylinder having a diameter sized to reach the critical field value at a given current, and is contained in its own small and easily controlled cryogenic container 34. Pilot superconductor 32 is then thermally coupled to device 31 by thermal link 35 to cause switching of device 31 by the heat propagated along link 35 when device 32 is magnetically switched. Note that link 35 can itself be a superconductor coupling the pilot cylinder 32 to the more complex and larger device 31 and permitting the rapid propagation of thermal energy from cylinder 32 to device 31.

In the embodiment of FIG. 4, the impedance 30 may be a resistor of conventional material which has a resistance which is lower than the resistance of superconductor 31 when it is in its resistive state. If desired, resistor 30 can be of a material such as pure iron or pure tungsten, and has a high positive resistance-temperature characteristic. During normal operation, both impedances 31 and 32 are in their superconducting state, and impedance 30 is short circuited. When the current in the circuit reaches a given value, and the critical field is reached for pilot device 32, it becomes resistive, and begins to generate heat as current divides between impedance 32 and impedance 30. Note that the resistance of device 32 in its resistive state can be low, and need not apply a significant voltage surge in the system. As the heat of device 32 is conducted by connection 35 to device 31, the device 31 heats to above its critical value and becomes resistive, thereby shunting the majority of the system current through current limiting impedance 30. With the current so limited, interrupter 11 is operated to completely open the circuit.

Figure 5:
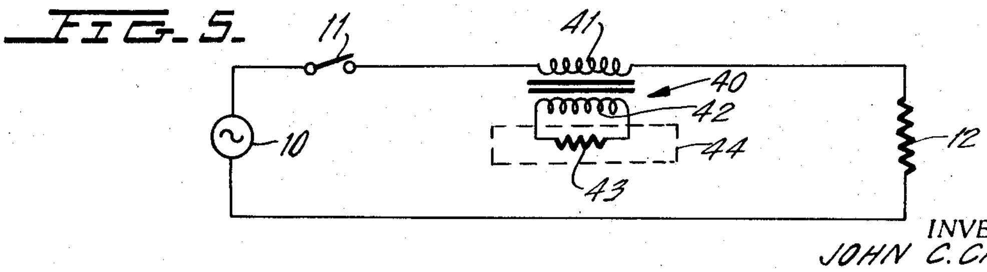
FIG. 5 shows an embodiment of the invention in which the impedance of a superconductor is reflected into the primary winding of a series transformer.

FIG. 5 shows a further embodiment of the invention which permits the use of a relatively small superconducting element which is isolated from the line being protected to reduce heat inflow problems and permitting a smaller cooling system. In the circuit of FIG. 5, the current limiter structure in the circuit including source 10, switch 11 and load 12 consists of a transformer 40 which has a primary winding 41 in series with the main circuit, and a secondary winding 42 having superconducting element 43 connected thereacross. Superconductor 43 is provided with a cooling system 44 and is electrically and thermally isolated from the main circuit.

During normal operation, superconductor 43 acts as a short circuit so that the impedance seen at the primary winding 41 is very low. Note that the current in superconductor 42 is related to the current in primary winding 41 by the turns ratio of the turns of windings 41 and 42.

Once the current in the primary circuit reaches a given value, the secondary current in winding 42 also reaches a given value required to switch superconductor 43 to a resistive state. The effective primary impedance $Z_p$ is then equal to the product of the square of the ratio of number of turns in the primary to the secondary winding, and the secondary impedance, which is essentially the impedance of member 43 in its resistive state. It will be clear that the superconducting device can be relatively small since its reflected impedance in the primary circuit will depend on the primary to secondary turns ratio which can be high.

Although this invention has been described with respect to particular embodiments, it should be understood that many variations and modifications will now be obvious to those skilled in the art, and, therefore, the scope of this invention is limited not by the specific disclosure herein, but only by the appended claims.

The embodiments of the invention in which an exclusive privilege or property is claimed are defined as follows:

1. A current limiting circuit comprising, in combination:

an elongated superconductive member;

means associated with said superconductive member for normally cooling said superconductive member to a temperature below its transition temperature;

an electrical impedance member having first and second terminals;

means for electrically coupling said superconductive member and said impedance member, whereby the effective impedance of said electrical impedance member between its said first and second terminals is by-passed when said superconductive member is in a superconducting state;

said first and second terminals comprising the terminals for the application of electrical energy in the form of current flow to said superconductive member; said superconductive member being arranged to switch from a superconducting state to a resistive state when the magnetic field due to said current flow reaches the critical value, whereby when said superconductive member switches to said resistive state, the effective impedance between said first and second terminals is increased, thereby to limit the magnitude of current flow between said first and second terminals;

and a second superconductive member connected in series with said superconductive member and means for normally cooling said second superconductive member; said second superconductive member having a greater length than said superconductive member; and means for thermally coupling said superconductive member to said second superconductive member whereby, when said superconductive member becomes resistive, heat generated therein is coupled to said second superconductive member, thereby to switch said second superconductive member to a resistive state.

2. In combination, an electrical power source, first and second superconductor members, means for cooling said first and second superconductor members to a temperature below their transition temperatures, and a load; said source, said first and second superconductor members, and said load connected in series, and means thermally coupling said first and second superconductor members; said first superconductor member being substantially longer than said second superconductor member and having a design whereby a magnetic field less than the critical field will be generated at the surface of said first superconductor member by current flow from said source which is below a given magnitude; said second superconductor member being designed to have the critical field thereof reached when a given current flow therethrough is reached; the heat generated in said second superconductor member after switching to its resistive state being applied to said first superconductor member, thereby to raise its temperature above its transition temperature to switch said first superconductor member to its resistive state.

3. The combination of claim 2 which further includes an impedance member electrically connected in parallel with said first superconductor member.

4. In combination, an electrical circuit to be protected and a current limiter for limiting the maximum current which can flow in said circuit; said current limiter comprising a transformer having a primary winding and a secondary winding, and a superconducting member and means for cooling said superconducting member to a temperature below its transition temperature; said primary winding being connected in series with said electrical circuit; said superconducting member being connected in parallel with said secondary winding; the impedance of said superconducting member being reflected into said primary winding and said electrical circuit; said superconducting member carrying a current related to the current of said electrical circuit and generating a magnetic field which reaches the critical value at a given current magnitude.

5. A current limiting circuit comprising, in combination:

an elongated superconductive member;

means associated with said superconductive member for normally cooling said superconductive member to a temperature below its transition temperature;

an electrical impedance member having first and second terminals;

means for electrically coupling said superconductive member and said impedance member, whereby the effective impedance of said electrical impedance member between its said first and second terminals is substantially zero when said superconductive member is in a superconducting state;

said first and second terminals comprising the terminals for the application of electrical energy in the form of current flow to said superconductive member; said superconductive member being arranged to switch from a superconducting state to a resistive state when the magnetic field due to said current flow reaches the critical value, whereby when said superconductive member switches to said resistive state, the effective impedance between said first and second terminals is increased, thereby to limit the magnitude of current flow between said first and second terminals; said impedance member comprising a transformer having primary and secondary windings; said primary winding connected between said first and second terminals, respectively; said superconductive member connected directly across said secondary winding.

* * * * *